(12) United States Patent
Yeh (10) Patent No.: US 10,704,671 B2
(45) Date of Patent: Jul. 7, 2020

(54) ASSISTING ELEMENT STRUCTURE FOR PADDLE SHIFTER OF VEHICLE

(71) Applicant: LEYO PERFORMANCE CO., LTD., Tainan (TW)

(72) Inventor: Hsin-Cheng Yeh, Tainan (TW)

(73) Assignee: LEYO PERFORMANCE CO., LTD., Tainan (TW)

( * ) Notice: Subject to any disclaimer, the term of this patent is extended or adjusted under 35 U.S.C. 154(b) by 177 days.

(21) Appl. No.: 15/968,904

(22) Filed: May 2, 2018

(65) Prior Publication Data

US 2019/0113131 A1   Apr. 18, 2019

(30) Foreign Application Priority Data

Oct. 17, 2017  (TW) .............................. 106215211 U (51) Int. Cl.
*F16H 59/02*     (2006.01)
*F16H 59/04*     (2006.01)
*B60K 20/06*     (2006.01)

(52) U.S. Cl.
CPC ......... *F16H 59/0278* (2013.01); *B60K 20/06* (2013.01); *F16H 59/04* (2013.01); *F16H 2059/0247* (2013.01)

(58) Field of Classification Search
CPC .................. F16H 59/0278; F16H 59/04; F16H 2059/0247; F16H 2059/0239; B60K 20/06; Y10T 74/20738; Y10T 74/2075; Y10T 74/20762; Y10T 74/20774; Y10T 16/4719; Y10T 16/4713; G05G 1/04
See application file for complete search history.

(56) References Cited

U.S. PATENT DOCUMENTS

| 5,231,731 A * | 8/1993 | Jones, Jr. | ............... E05B 1/0053 16/412 |
| 5,288,116 A * | 2/1994 | Donofrio | ............... E05B 1/0053 16/DIG. 30 |
| 5,725,264 A * | 3/1998 | Villarreal | ............... E05B 1/0053 292/347 |

* cited by examiner

*Primary Examiner* — Daniel D Yabut
(74) *Attorney, Agent, or Firm* — Rosenberg, Klein & Lee (57) ABSTRACT

An assisting element structure for a paddle shifter of a vehicle includes: an operating body having a centrally-disposed flange, with a first and second extending portions disposed at two ends of the operating body, respectively, the flange having therein a receiving chamber which the paddle shifter is fitted in; a groove corresponding in position to the first extending portion is concavely disposed on the flange, wherein a first through hole, a second through hole and a threaded hole are disposed at two ends and a middle of the groove, respectively, and a baffle corresponding in position to an inner wall of the second extending portion is disposed on the flange; a pressing element disposed in the groove and having two ends with a first and second elastic segments corresponding in position to the first and second through holes, respectively; and a screwing component disposed in the threaded hole.

7 Claims, 8 Drawing Sheets

ASSISTING ELEMENT STRUCTURE FOR PADDLE SHIFTER OF VEHICLE

BACKGROUND OF THE INVENTION

1. Technical Field

The present disclosure relates to assisting element structures for paddle shifters of vehicles and, more particularly, to an assisting element structure for a paddle shifter of a vehicle. Since a baffle and a pressing element are disposed on the inner wall of a flange of the assisting element structure, a screwing component moves the pressing element and thus moves the paddle shifter, thereby positioning the lateral edge of the paddle shifter below the baffle disposed on the flange. Hence, the paddle shifter is firmly positioned inside the flange because of dual limitations attributed to the baffle and the pressing element.

2. Description of Related Art

Figure 1:
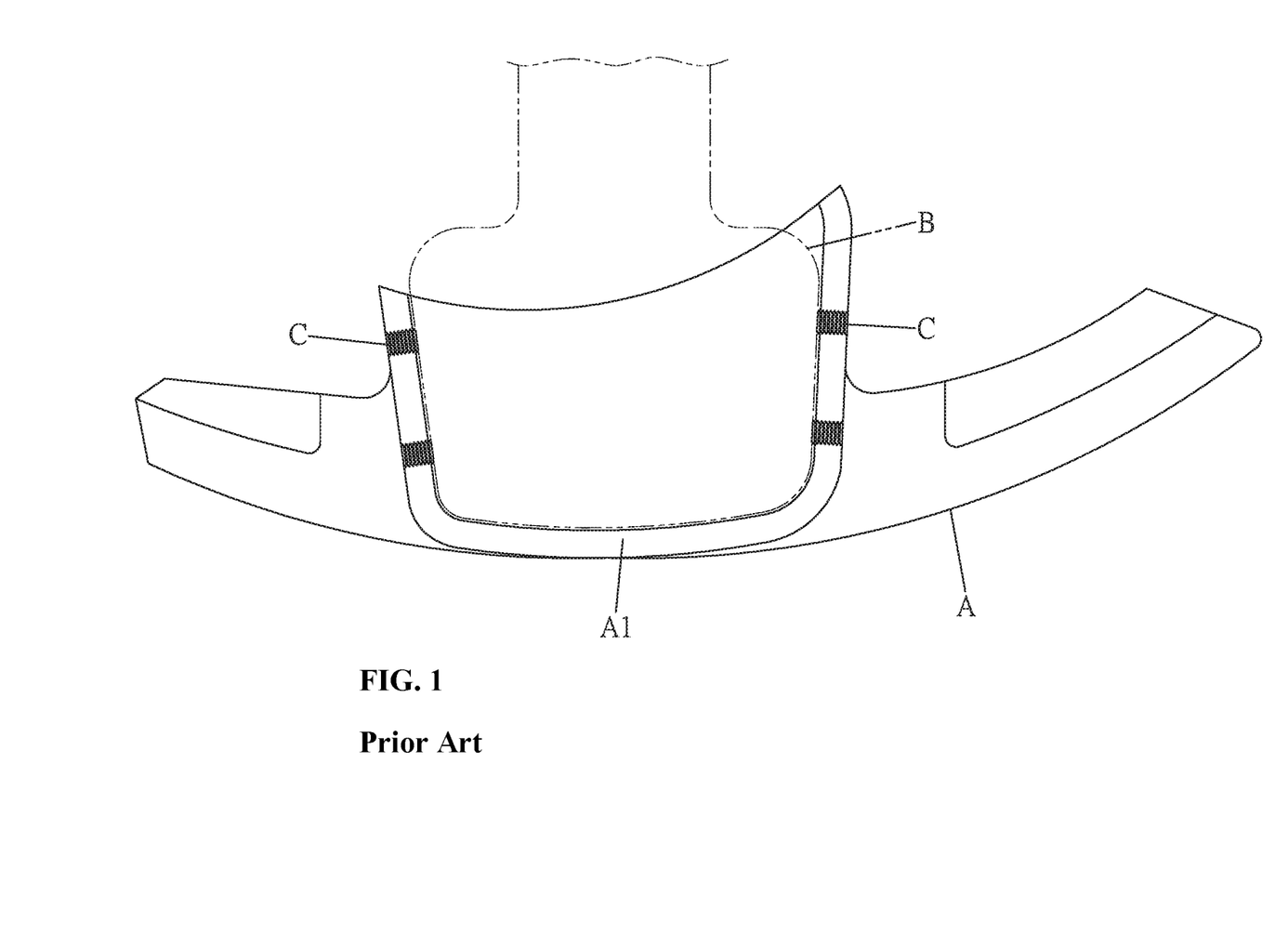
FIG. 1 (PRIOR ART) is a bottom plan view of a paddle shifter and a conventional assisting element which are fixed in place, using set screws.
Figure 2:
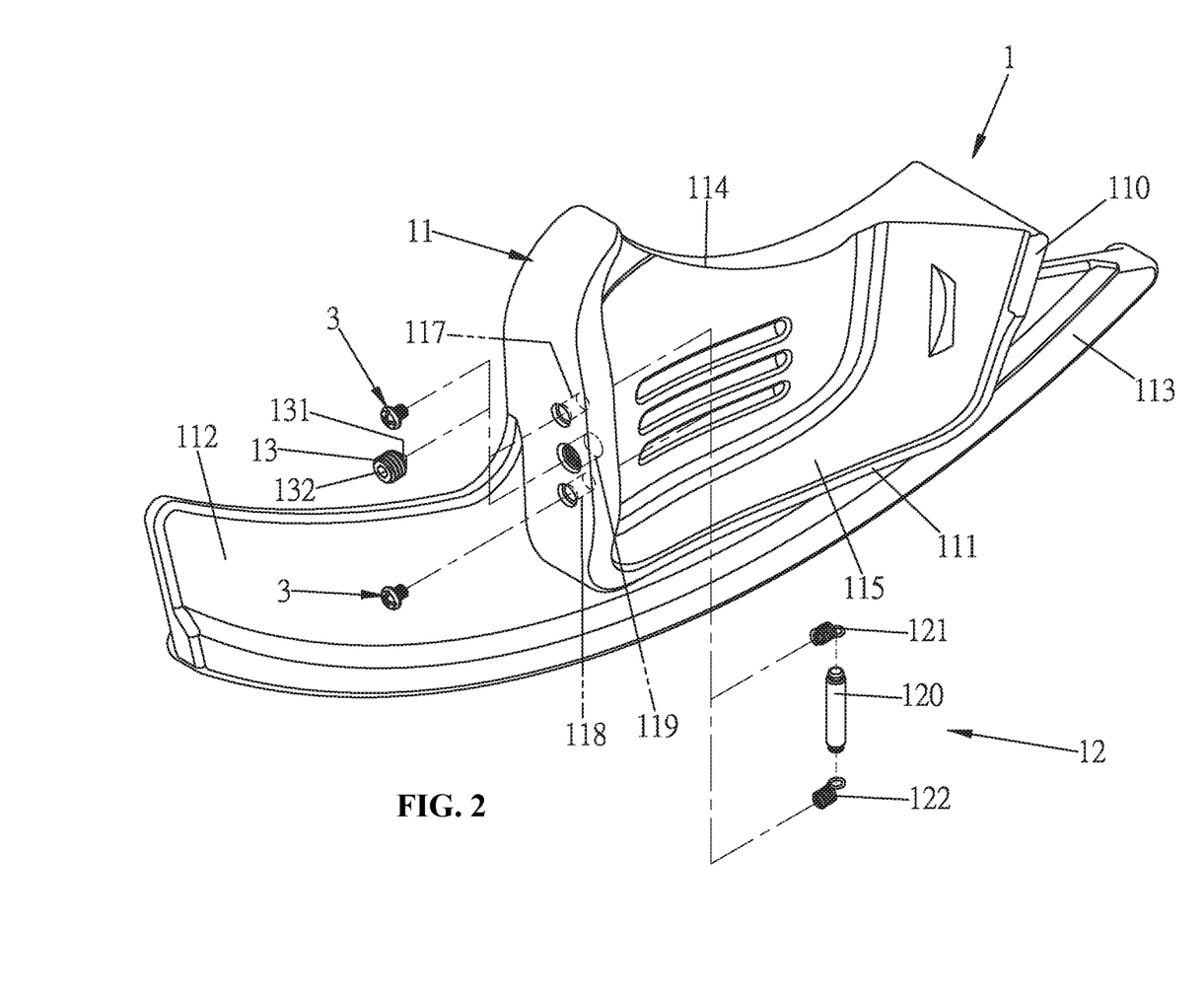
FIG. 2 is an exploded view of an assisting element structure according to the present disclosure.
Figure 3:
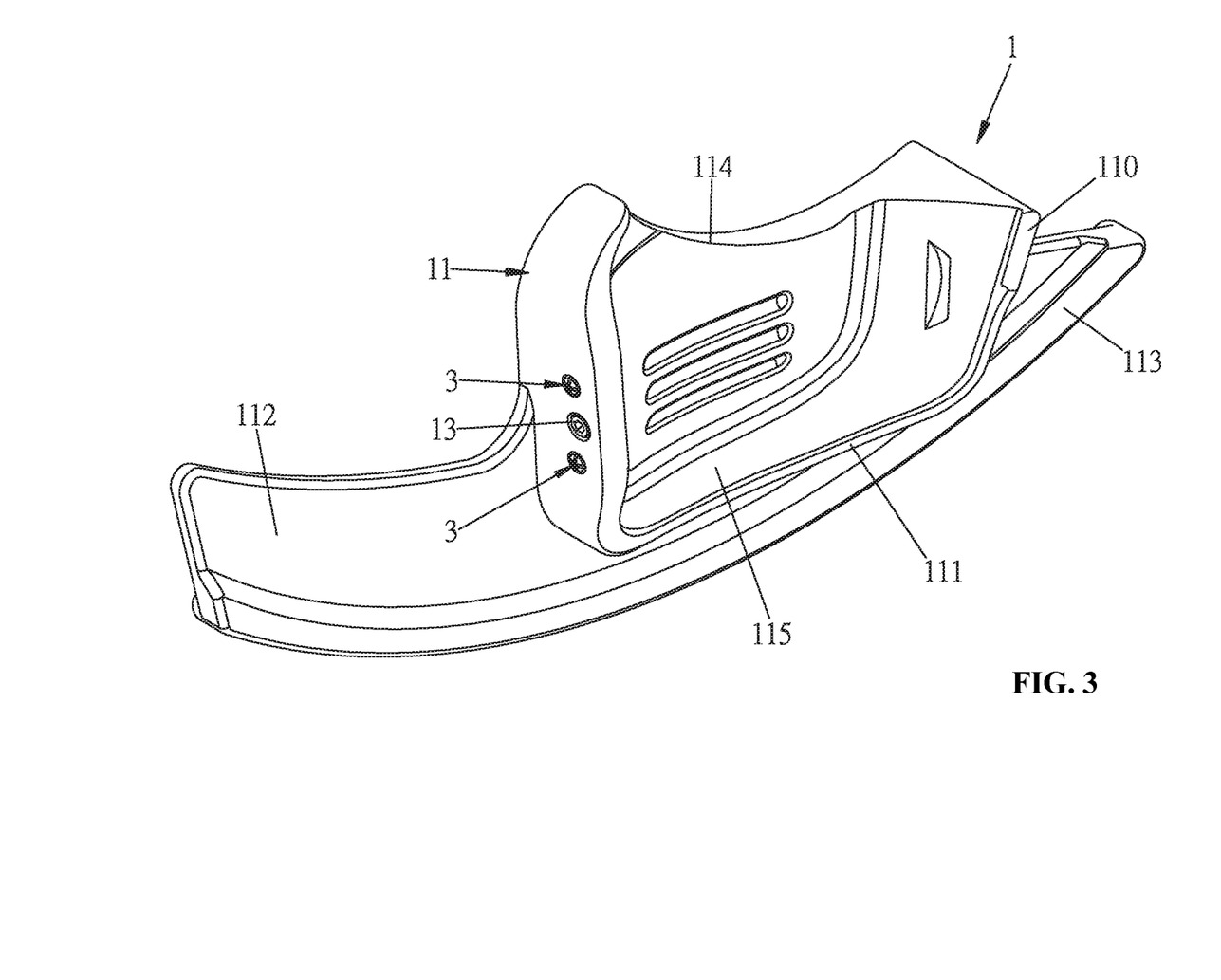
FIG. 3 is a perspective view of the assisting element structure according to the present disclosure.
Figure 4:
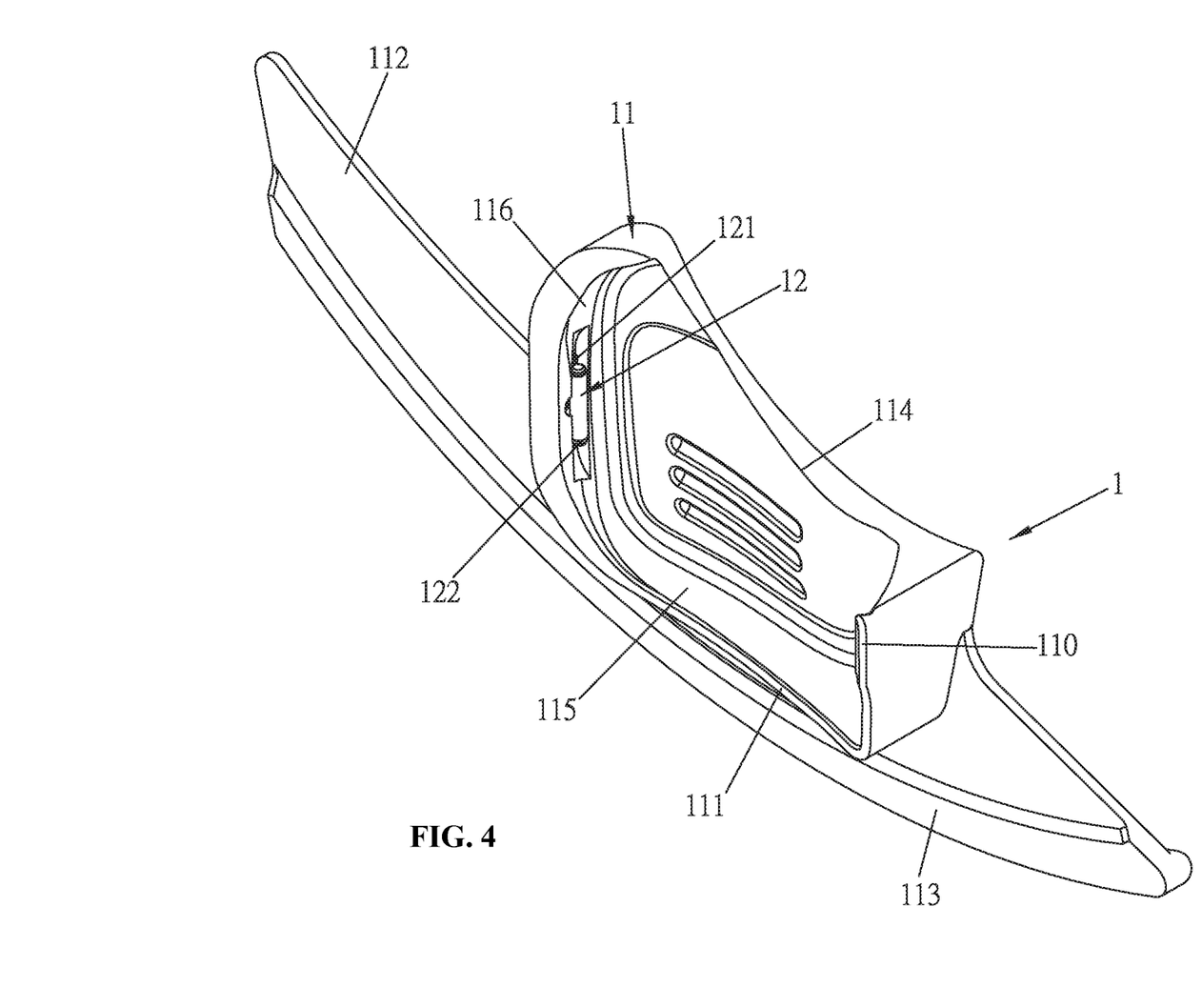
FIG. 4 is a perspective view of the assisting element structure taken from another angle according to the present disclosure.
Figure 5:
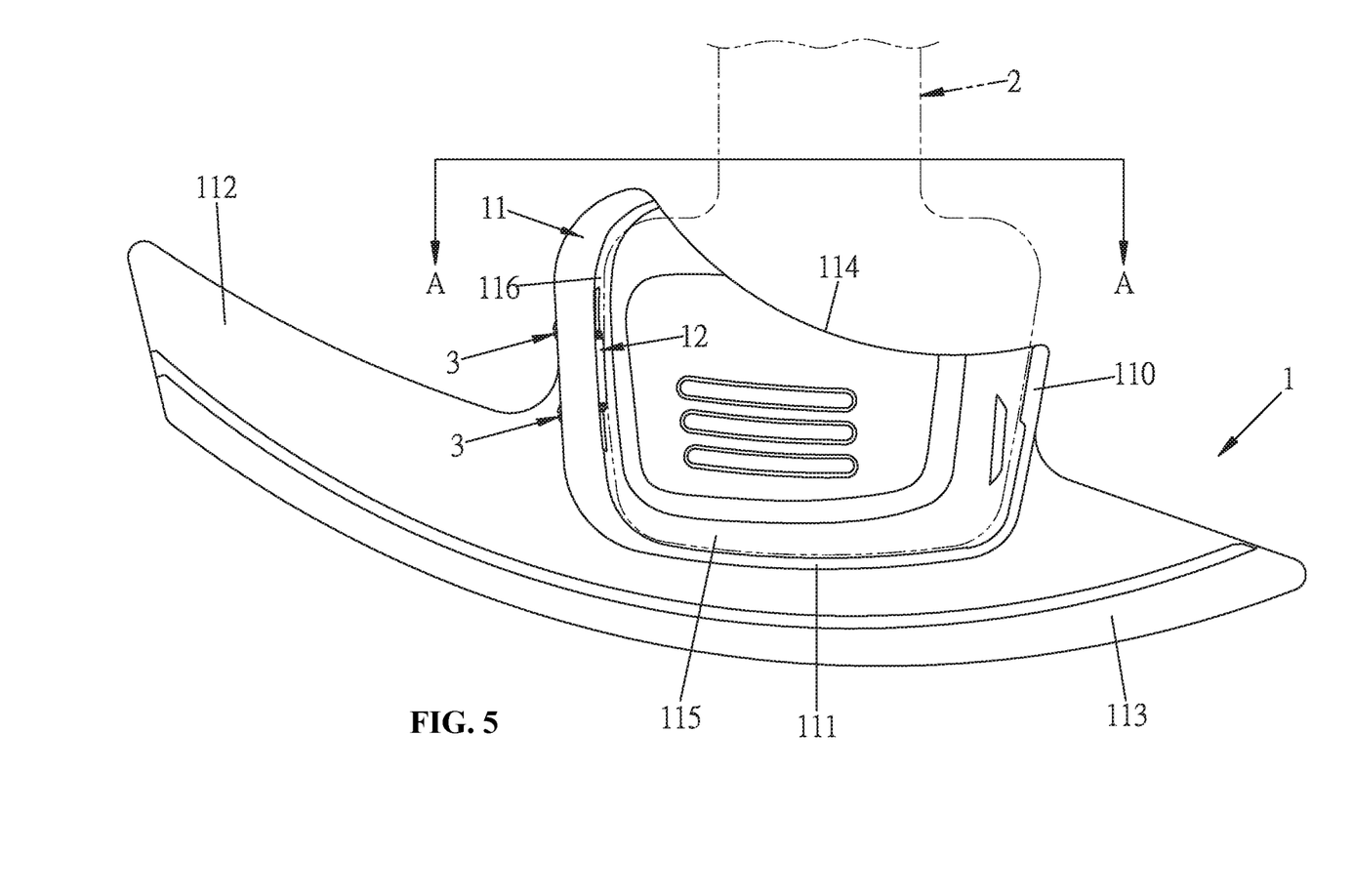
FIG. 5 is a front view of the assisting element structure according to the present disclosure.
Figure 6:
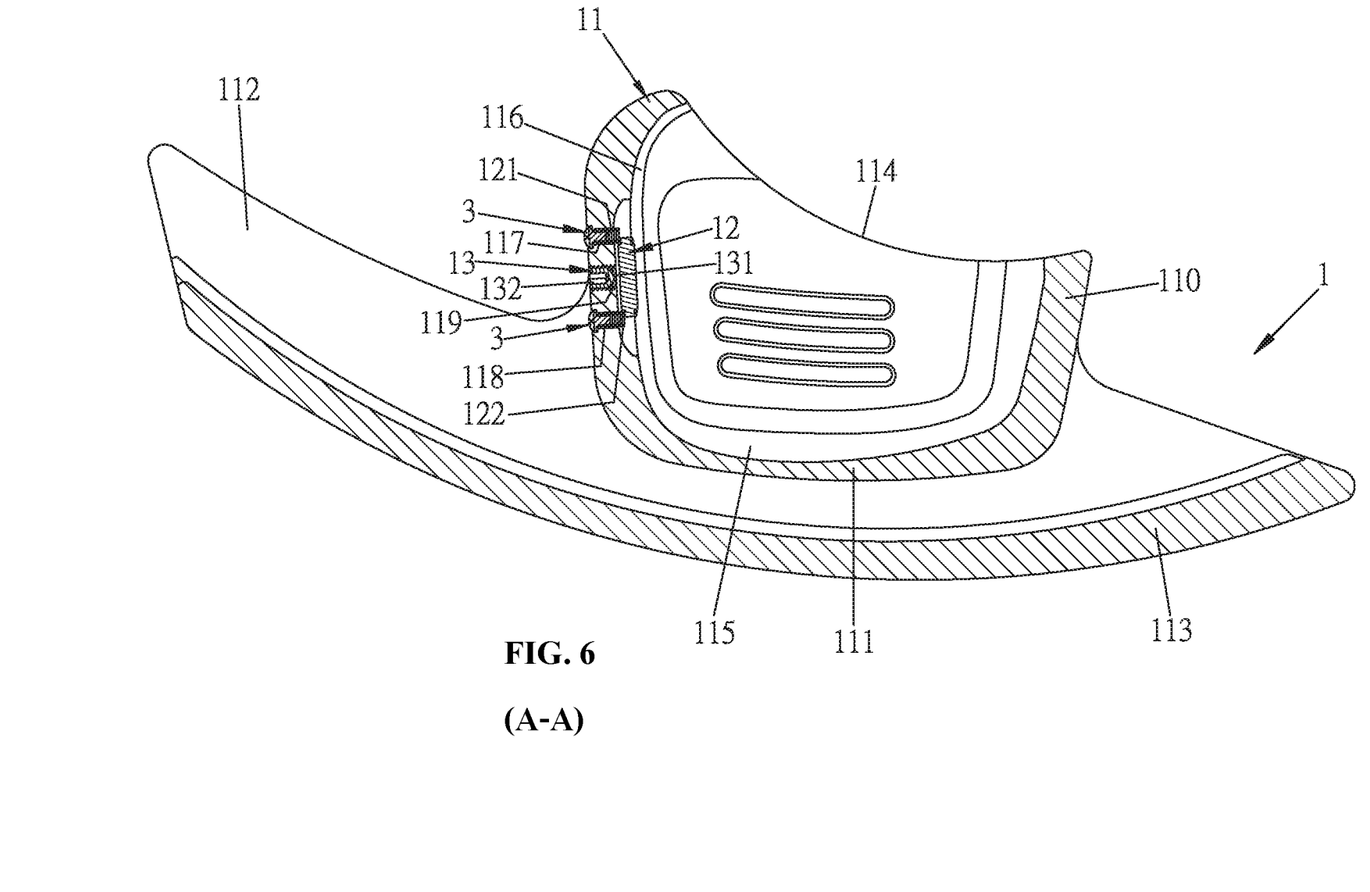
FIG. 6 is a cross-sectional view of the assisting element structure taken along line A-A of FIG. 5.

A paddle shifter of a vehicle is a gear shifting device mounted in place behind a steering wheel of the vehicle. Two paddle shifters are disposed on the left and right of the steering wheel to achieve acceleration and deceleration of the vehicle, respectively. However, with the paddle shifters being hidden behind the steering wheel, drivers often complain about overly short gear shifting length (especially those drivers with short fingers). Nowadays there are commercially-available assisting element-related products which extend the operating areas of the paddle shifters. Referring to FIG. 1, a commercially available assisting element A includes a flange A1 penetrated by four set screws C and then presses against a paddle shifter B to position the paddle shifter B in place.

However, the conventional assisting element A in operation has drawbacks as follows:

1. To position the paddle shifter B in place firmly, the conventional assisting element A has set screws C abutting against the surface of the paddle shifter B. The set screws C are perpendicular to and in contact with the lateral surface of the paddle shifter B in order to be fastened thereto. However, the set screws C damage the surface of the paddle shifter B.

2. The conventional paddle shifter B is fastened in place, using the four set screws C which are symmetrically aligned in a front-to-rear direction. The four set screws C press against the paddle shifter B which is made of a plastic. The conventional assisting element A vibrates while the vehicle is advancing or undergoing gear shifting. Given time, the conventional assisting element A is likely to loosen.

3. The conventional paddle shifter B and the conventional assisting element A are fixed together by the set screws C. The conventional paddle shifter B, which is made of a plastic, is likely to crack at the junction of the conventional paddle shifter B and the conventional assisting element A, thereby causing the conventional assisting element A to loosen.

4. The way of fixing the conventional assisting element A to the conventional paddle shifter B by the set screws C is likely to cause damage to the contact surface of the conventional paddle shifter B. Furthermore, screwing the set screws C is laborious and time-consuming to the detriment of industrial applicability.

SUMMARY OF THE DISCLOSURE

It is an objective of the present disclosure to provide an assisting element structure which fixes a paddle shifter in place without damaging the surface of the paddle shifter. According to the present disclosure, since a baffle and a pressing element are disposed on the inner wall of a flange of the assisting element structure, a screwing component moves the pressing element and thus moves the paddle shifter, thereby positioning the lateral edge of the paddle shifter below the baffle disposed on the flange. Hence, the paddle shifter is firmly positioned inside the flange because of dual limitations attributed to the baffle and the pressing element.

In order to achieve the above and other objectives, the present disclosure provides an assisting element structure for a paddle shifter of a vehicle, comprising: an operating body having a centrally-disposed flange, wherein a first extending portion and a second extending portion are disposed at two ends of the operating body, respectively, the flange having therein a receiving chamber which an outer end of the paddle shifter is fitted in; a groove corresponding in position to an inner wall of the first extending portion is concavely disposed on the flange, wherein a first through hole, a second through hole and a threaded hole are disposed at two ends and a middle of the groove, respectively; a baffle corresponding in position to an inner wall of the second extending portion and disposed on the flange; a pressing element disposed in the groove of the flange and having a rod, a first elastic segment and a second elastic segment, wherein two ends of the rod are connected to the first elastic segment and the second elastic segment, respectively, wherein the first elastic segment and the second elastic segment correspond in position to the first through hole and the second through hole in the groove, respectively, wherein the first through hole and the second through hole are each penetrated by a bolt such that the first elastic segment and the second elastic segment are fixed in place inside the first through hole and the second through hole, respectively; and a screwing component disposed in the threaded hole.

In some embodiments, the flange has an opening.

In some embodiments, the screwing component has an inner end forming a conical point portion.

In some embodiments, a wrench-inserted slot is concavely disposed at an outer end of the screwing component.

In some embodiments, the first elastic segment of the pressing element is a tension spring penetrable by the bolt and screwedly fixed in the first through hole.

In some embodiments, the second elastic segment of the pressing element is a tension spring penetrable by the bolt and screwedly fixed in the second through hole.

In some embodiments, an inner end of the conical point portion of the screwing component abuts against an outer rim of the rod of the pressing element, and a center of the screwing component is higher than a center of the pressing element.

According to the present disclosure, an assisting element structure for a paddle shifter of a vehicle improves on a conventional assisting element structure by positioning the paddle shifter in place firmly without damaging the surface of the paddle shifter. Since the baffle and the pressing element are disposed on the inner wall of the flange of the assisting element structure, the screwing component moves the pressing element and thus moves the paddle shifter, thereby positioning the lateral edge of the paddle shifter below the baffle disposed on the flange. Hence, the paddle shifter is firmly positioned inside the flange because of dual limitations attributed to the baffle and the pressing element.

DETAILED DESCRIPTION OF THE PREFERRED EMBODIMENTS

Referring to FIG. 2 through FIG. 8, the present disclosure provides an assisting element structure 1 for a paddle shifter 2 of a vehicle. The assisting element structure 1 comprises an operating body 11, a pressing element 12, and a screwing component 13.

The operating body 11 has a centrally-disposed flange 111. A first extending portion 112 and a second extending portion 113 are disposed at two ends of the operating body 11, respectively. The flange 111 has an opening 114. The flange 111 has therein a receiving chamber 115 which the outer end of the paddle shifter 2 is fitted in. A groove 116 corresponding in position to the inner wall of the first extending portion 112 is concavely disposed on the flange 111. A first through hole 117, a second through hole 118 and a threaded hole 119 (shown in FIG. 2) are disposed at two ends and a middle of the groove 116, respectively. A baffle 110 corresponding in position to the inner wall of the second extending portion 113 is disposed on the flange 111.

The pressing element 12 is disposed in the groove 116 of the flange 111. The pressing element 12 has a rod 120, a first elastic segment 121 and a second elastic segment 122. The two ends of the rod 120 are connected to the first elastic segment 121 and the second elastic segment 122, respectively. The first elastic segment 121 and the second elastic segment 122 correspond in position to the first through hole 117 and the second through hole 118 in the groove 116, respectively. The first through hole 117 and the second through hole 118 are each penetrated by a bolt 3 such that the first elastic segment 121 and the second elastic segment 122 are fixed in place inside the first through hole 117 and the second through hole 118, respectively.

Figure 8:
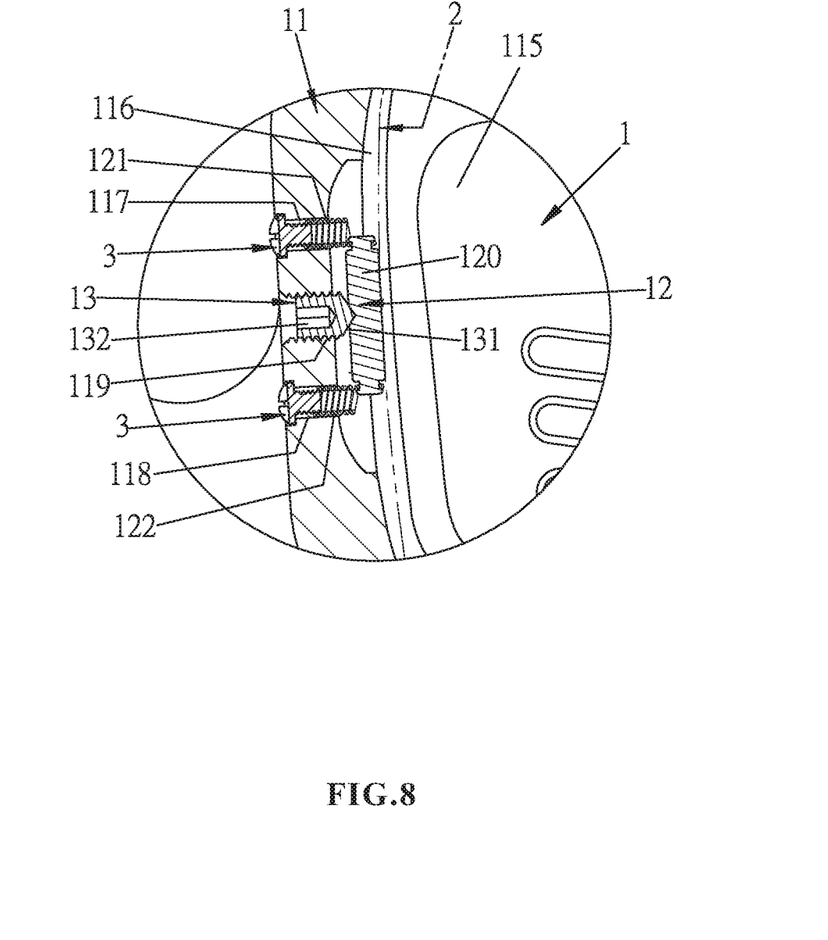
FIG. 8 is a cross-sectional view of the assisting element structure taken while operating according to the present disclosure.

The screwing component 13 is disposed in the threaded hole 119. The screwing component 13 has an inner end which forms a conical point portion 131. A wrench-inserted slot 132 is concavely disposed at the outer end of the screwing component 13. The inner end of the conical point portion 131 of the screwing component 13 abuts against the outer rim of the rod 120 of the pressing element 12. The center of the screwing component 13 is higher than the center of the pressing element 12 (as shown in FIG. 8).

According to the present disclosure, since the baffle 110 and the pressing element 12 are disposed on the inner wall of the flange 111 of the assisting element structure 1, the screwing component 13 moves the pressing element 12 and thus moves the paddle shifter 2, thereby positioning the lateral edge of the paddle shifter 2 below the baffle 110 disposed on the flange 111. Hence, the paddle shifter 2 is firmly positioned inside the flange 111 because of dual limitations attributed to the baffle 110 and the pressing element 12.

Figure 7:
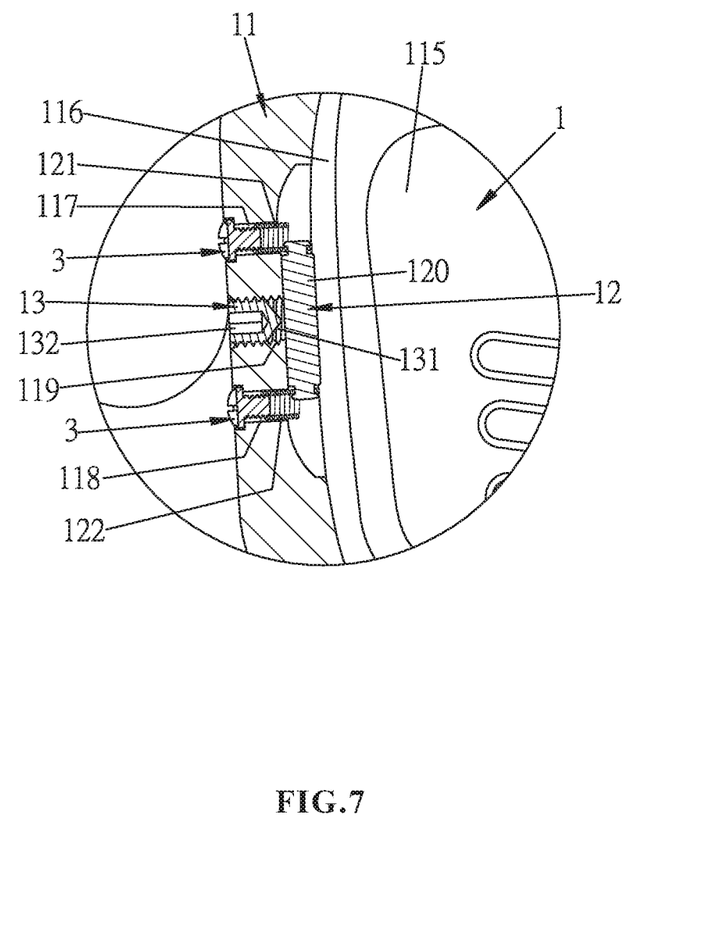
FIG. 7 is a cross-sectional view of the assisting element structure taken before operation according to the present disclosure.

According to the present disclosure, connecting the operating body 11 which the pressing element 12 and the screwing component 13 are disposed on to the paddle shifter 2 entails a user's fitting the receiving chamber 115 of the flange 111 of the operating body 11 around the outer end of the paddle shifter 2, inserting a wrench tool (not shown) into the wrench-inserted slot 132 of the screwing component 13, and rotating the wrench tool to cause the conical point portion 131 formed at the inner end of the screwing component 13 to abut against the outer rim of the rod 120 of the pressing element 12. Therefore, the rod 120 of the pressing element 12 is elastically pulled and stretched by the first elastic segment 121 and the second elastic segment 122 and thereby moves out of the groove 116 (as shown in FIG. 7 and FIG. 8.) As a result, the moving rod 120 of the pressing element 12 causes the paddle shifter 2 to move, thereby positioning the other edge of the paddle shifter 2 below the baffle 110 disposed on the inner wall of the flange 111 (as shown in FIG. 7 and FIG. 8.) Therefore, the rod 120 of the paddle shifter 2 is firmly clamped and fitted inside the receiving chamber 115 in the flange 111.

According to the present disclosure. The screwing component 13 and the pressing element 12 of the assisting element structure 1 enable the paddle shifter 2 to engage with the baffle 110 disposed on the inner wall of the flange 111 of the assisting element structure 1 and thus become positioned in place, so as to reduce required points of positioning the paddle shifter 2, cause no damage to the surface of the paddle shifter 2, and enhance the stability of the positioning of the assisting element structure 1 and the paddle shifter 2 by the elasticity of the pressing element 12.

As indicated above, according to the present disclosure, an assisting element structure for a paddle shifter of a vehicle has advantages as follows:

1. According to the present disclosure, since the baffle 110 and the pressing element 12 are disposed on the inner wall of the flange 111 of the assisting element structure 1, the screwing component 13 moves the pressing element 12 and thus moves the paddle shifter 2, thereby positioning the lateral edge of the paddle shifter 2 below the baffle 110 disposed on the flange 111. Hence, the paddle shifter 2 is firmly positioned inside the flange 111 because of dual limitations attributed to the baffle 110 and the pressing element 12.

2. According to the present disclosure, not only is the lateral edge of the paddle shifter 2 positioned below the baffle 110 because the baffle 110 is disposed on the flange 111 and corresponds in position to the inner wall of the second extending portion 113, but a single said screwing component 13 also fixes the paddle shifter 2 in place, thereby allowing the assisting element structure 1 to be connected to the paddle shifter 2 quickly and conveniently.

3. According to the present disclosure, not only does the groove 116 disposed on the inner wall of the flange 111 ensure that the paddle shifter 2 is firmly fitted inside the receiving chamber 115 in the flange 111, but the screwing component 13 and the pressing element 12 also enable the paddle shifter 2 to be connected to the flange 111 and thus positioned in place, so as to reduce required points of positioning the paddle shifter 2 and enhance the stability of the positioning of the assisting element structure 1 and the paddle shifter 2.

4. According to the present disclosure, not only does the inner end of the conical point portion 131 of the screwing component 13 abut against the outer rim of the rod 120 of the pressing element 12, but the center of the screwing component 13 is also higher than the center of the rod 120 of the pressing element 12, such that a user only needs to rotate the screwing component 13 and thereby allow the pressing element 12 to be moved and stretched elastically for achieving spatial adjustment and press against the paddle shifter 2 for positioning.

5. According to the present disclosure, the pressing element 12 positions the paddle shifter 2 in place by linear contact and thus causes no damage to the surface of the paddle shifter 2 even though the pressing element 12 presses against the paddle shifter 2.

6. According to the present disclosure, the first elastic segment 121 of the pressing element 12 is a tension spring penetrable by the bolt 3 and screwedly fixed in the first through hole 117, whereas the second elastic segment 122 of the pressing element 12 is a tension spring penetrable by the bolt 3 and screwedly fixed in the second through hole 118, thereby rendering the pressing element 12 capable of tightening and loosening elastically to therefore restrict and provide space required for adjustment of the pressing element 12.

What is claimed is:

1. An assisting element structure for a paddle shifter of a vehicle, comprising:
   an operating body having a centrally-disposed flange, wherein a first extending portion and a second extending portion are disposed at two ends of the operating body, respectively, the flange having therein a receiving chamber in which an outer end of the paddle shifter is fitted;
   a pressing element disposed on an inner wall of the flange; and
   a screwing component disposed on an outer wall of the flange;
   characterized in that:
   a groove corresponding in position to an inner wall of the first extending portion is concavely disposed on the flange, wherein a first through hole, a second through hole and a threaded hole are disposed at two ends and a middle of the groove, respectively, and a baffle corresponding in position to an inner wall of the second extending portion is disposed on the flange, with the pressing element disposed in the groove of the flange and having a rod, a first elastic segment and a second elastic segment, wherein two ends of the rod are connected to the first elastic segment and the second elastic segment, respectively, wherein the first elastic segment and the second elastic segment correspond in position to the first through hole and the second through hole in the groove, respectively, wherein the first through hole and the second through hole are each penetrated by a bolt such that the first elastic segment and the second elastic segment are fixed in place inside the first through hole and the second through hole, respectively, with the screwing component disposed in the threaded hole.

2. The assisting element structure of claim 1, wherein the flange has an opening.

3. The assisting element structure of claim 1, wherein the screwing component has an inner end forming a conical point portion.

4. The assisting element structure of claim 3, wherein an inner end of the conical point portion of the screwing component abuts against an outer rim of the rod of the pressing element, and a center of the screwing component is higher than a center of the pressing element.

5. The assisting element structure of claim 1, wherein a wrench-inserted slot is concavely disposed at an outer end of the screwing component.

6. The assisting element structure of claim 1, wherein the first elastic segment of the pressing element is a tension spring penetrated by the bolt, the bolt being screwedly fixed in the first through hole.

7. The assisting element structure of claim 1, wherein the second elastic segment of the pressing element is a tension spring penetrated by the bolt, the bolt being screwedly fixed in the second through hole.

\* \* \* \* \*